United States Patent [19]

Bril et al.

[11] Patent Number: 5,412,800
[45] Date of Patent: May 2, 1995

[54] SYSTEM FOR RUNNING INCOMPATIBLE GRAPHICS PROGRAMS

[75] Inventors: Vlad Bril, Campbell; Paul W. T. Heller, San Jose, both of Calif.

[73] Assignee: Cirrus Logic, Inc., Fremont, Calif.

[21] Appl. No.: 134,509

[22] Filed: Oct. 8, 1993

Related U.S. Application Data

[63] Continuation of Ser. No. 994,606, Dec. 21, 1992, abandoned, which is a continuation of Ser. No. 357,386, May 25, 1989, abandoned.

[51] Int. Cl.$^6$ ............................................. G06F 9/455
[52] U.S. Cl. .................... 395/500; 364/232.3; 364/237.2; 364/264.3; 364/DIG. 1; 364/247
[58] Field of Search ................. 395/500, 600, 650, 700

[56] References Cited

U.S. PATENT DOCUMENTS

| | | | |
|---|---|---|---|
| 4,825,358 | 4/1989 | Letwin | 364/200 |
| 4,872,054 | 10/1989 | Gray et al. | 364/413.13 |
| 4,890,219 | 12/1989 | Heath et al. | 364/200 |
| 4,958,378 | 9/1990 | Bell | 340/721 |
| 4,977,398 | 12/1990 | Pleva et al. | 340/793 |
| 5,088,033 | 2/1992 | Binkley et al. | 395/500 |

*Primary Examiner*—Kevin A. Kriess
*Assistant Examiner*—John Q. Chavis
*Attorney, Agent, or Firm*—Skjerven, Morrill, MacPherson, Franklin & Friel; David W. Heid; William L. Paradice, III

[57] ABSTRACT

A method and apparatus for executing any one of a plurality of computer programs for operation of a single output device in a computer system through the control of parameters loaded in registers in the system, the computer system having program compatibility requirements for programs to be executed, includes commencing execution of each of the programs as if it were compatible with said system program compatibility requirements, and modifying the results of any attempts by the program being executed to directly load the register parameters controlling the output device if the loading attempts are non-compatible with the system program compatibility requirements, the modification making the results of the loading attempts system compatible.

19 Claims, 5 Drawing Sheets

SYSTEM FOR RUNNING INCOMPATIBLE GRAPHICS PROGRAMS

This application is a continuation of application Ser. No. 07/994,606 filed Dec. 21, 1992 which is a continuation of application Ser. No. 07/357,386 filed May 25, 1989, both now abandoned.

BACKGROUND OF THE INVENTION

1. Field Of The Invention

This invention relates in general to the execution of different computer programs, and relates more particularly to the execution of a number of different incompatible programs on a single particular type of output device without the need for any special utility program.

2. Prior Art

There are a very large number of computer programs available for controlling the display of different types of information, either graphics or text, on a CRT monitor through its associated controller. There are a large number of programs compatible with, and designed to run on, display controllers offered by Hercules Computer Technology Co. ("Hercules"). These controllers include the Hercules Graphics Card (current model GB102, previous model GB100 and GB101), as well as Hercules Graphics Card Plus (GB112), and clones known as "Hercules Cards". Because of this large number of Hercules-controller-compatible software, the specifications of the Hercules Cards are known as "Hercules Standard". Other graphics programs operate on computers in the IBM PC* and PS/2 lines and clones thereof.
* (IBM, IBM PC, and PC-DOS are trademarks of International Business Machines Corporation.)

These Hercules cards are designed to drive, using digital transistor/transistor logic (TTL) compatible signals, monitors compatible with IBM's Monochrome Display Adapter (MDA). These monitors use a 16 MHz pixel clock frequency. Because these Hercules graphics programs are not supported by the IBM PC Disk Operating System (DOS)*, nor by the IBM Basic Input/Output System (BIOS), the Hercules programs operate directly upon the CRT controller registers of the Hercules cards. These registers are compatible with a CRT controller based on a 6845 integrated circuit originally manufactured by Motorola. There are 18 6845 CRT controller parameters to be programmed by each application. Each parameter can have multiple valid working values during the execution of a single program as well as across programs.
* (IBM, IBM PC, and PC-DOS are trademarks of International Business Machines Corporation.)

With the introduction by IBM of the Video Graphics Array (VGA) graphics systems, a new type of monitor was also introduced into the IBM PC field; the PS/2 Monitor, which is a fixed-frequency analog monitor. Non-IBM versions of these monitors have been brought out by other companies, resulting in a new class of monitors known as "PS/2 Compatible Monitors".

The large body of existing Hercules programs described above can not run on these PS/2 Compatible Monitors without some sort of special intervention. The reason the Hercules programs do not naturally run on PS/2-compatible monitors is because these monitors require a 31.5 KHz horizontal sync signal and a 60 to 70 Hz vertical sync signal, which are generated from a 28 MHz pixel clock frequency in text mode and a 25 MHz pixel clock frequency in graphics mode.

In contrast, the Hercules programs were written for digital monochrome monitors with an 18.4 KHz horizontal sync signal and a 50 Hz vertical sync frequency, generated from a 16.256 MHz pixel clock frequency. Thus, the horizontal, vertical and the pixel clock frequencies required by the PS/2 compatible monitors are much higher than the corresponding frequencies used by the Hercules programs for controlling the 6845 CRT controller.

Accordingly, many 6845 CRT controller parameters must be modified to enable the Hercules programs to run on the new type of monitors. However, the Hercules programs directly control the 6845-compatible registers with values for MDA-compatible monitors, which are improper on the PS/2-compatible monitors. As a result, prior to the present invention, neither the IBM VGA, nor any IBM VGA compatible clone, were able to run graphics mode Hercules programs without a special utility.

Thus, there is a requirement for a system which can run Hercules programs written for MDA monitors, but which runs them on PS/2-compatible monitors, even if these programs write directly to the 6845 CRT controller timing registers, without requiring any special utility program to notify the controller whether the program running is a Hercules program or not. This need is complicated by the additional requirement for a 6845-compatible controller that is also compatible with software written for VGA and Enhanced Graphics Adapter (EGA)* compatible PC video systems.
* EGA is a trademark of International Business Machines Corporation.

One reason that this is a difficult requirement to meet is that while the VGA and EGA CRT controller registers are very similar in their addressing and function, they are quite different from the 6845-compatible CRT controller registers used in the MDA, CGA, Hercules and Multi-Color Graphics Array (MCGA) PC video graphics systems. Another reason that this is a difficult requirement to meet is because the VGA/EGA CRT controller registers and the 6845 CRT controller registers are mapped at the same I/O addresses, so the controller can not distinguish between program types based on what I/O port they use.

One approach to running a Hercules program on a PS/2-compatible monitor is to employ a special utility program to establish a special mode by loading or writing all 6845 CRT controller registers with the appropriate values. If the controller has the capability of write protecting the 6845 CRT controller registers in a Hercules compatible manner (i.e. without I/O addressing conflicts), then the Hercules-compatible program could be run.

In this situation, the user employing the special utility program must know not only that his program is a Hercules program, but also whether it is graphics or text and, perhaps, what is the correct set of monitor parameters for the PS/2 Monitor. At a minimum, the user must determine, based on trial and error, which parameter set works for that particular program. Further, since a graphics program can run text in emulation mode, it is not easy for a PC user with no PC graphics technical knowledge to actually determine whether a program displaying text is running in a text mode or in a graphics mode.

Additionally, this special utility approach has still another disadvantage that the Hercules programs that use both text and graphics modes in the same program will not run effectively, because the PC user would have to run this utility to change the 6845 parameters while running the program, which would be annoying or intolerable.

To summarize, this relatively easy-to-implement special utility approach is both difficult to use and not totally satisfactory, in the sense that many Hercules programs, especially the more complex ones, would not really be usable.

SUMMARY OF THE PRESENT INVENTION

In accordance with one feature of this invention, a hardware mechanism is employed to run Hercules programs on PS/2 compatible monitors by determining whether the program attempting to control the 6845 registers is a graphics mode or a text mode program. This is a requirement because the parameters that are properly written into the registers are different between these two cases.

The present invention permits a CRT controller driving a PS/2-compatible monitor to execute the existing base of Hercules-compatible programs which directly program the 6845 CRT controller. No utility program is needed with this invention. The Hercules program can be executed exactly as if a Hercules card were in the system. The program runs as if an MDA-compatible monitor were connected to a Hercules card, even though a PS/2 monitor is actually connected to a non-Hercules PC graphics board.

It is yet another objective of the present invention to provide a system for running both VGA/EGA programs and 6845-compatible programs in a compatible manner. To achieve full hardware and software compatibility, the present invention includes a double engine in the sense that it has two actual CRT controllers; one which is compatible with VGA and EGA CRT controllers and the other one which is compatible with a 6845-CRT controller. As a result of this dual-engine architecture, the present invention provides two sets of CRT controller registers. One set is referred to as the "MCGA Registers" or the "6845 Registers" for direct hardware emulation of the CGA (Color Graphics Adapter), MGA (Monochrome Graphics Adapter) and Hercules cards, which all use 6845-like registers. These registers are accessable only while in CGA or MGA/HGC emulation mode, as discussed below. The other set is referred to as the "EGA/VGA CRT Controller Registers" or simply as the "CRTC Registers".

The present system can not only effectively run VGA, EGA, MCGA, Hercules, CGA and MGA programs, but it can also identify (based on I/O sequence decoding) when a VGA or EGA program is to be executed and automatically shift the operation from one CRT controller to the other. The CRT controller selection is done by a hardware block called the "Active Adaptive State Controller" which determines what state the graphics controller is to be in. There are 4 such states called: EGA/VGA, Enhanced Text, CGA, and Hercules. The first two select CRT controller operation for EGA or VGA-compatible operations, and the latter two select 6845-compatible operation.

Since both the 6845-compatible and the EGA/VGA-compatible CRT controller registers are mapped at the same I/O address, the present invention implements special rules relative to how the registers are written. If no set of registers is write protected, a write to the 6845 CRT controller registers affects both sets of registers if the system is in the EGA/VGA or Enhanced Text state, but affects only the 6845 registers if the system is in the Hercules or CGA state. Additionally, both the 6845 and the EGA/VGA CRT controller registers can be independently protected under software control, but in this case the present invention cannot be used in order to achieve a software transparent parameter translation. Both 6845 and EGA/VGA CRT controller registers can be read back by the software.

Because there are two sets of CRT controller registers, and because they are placed on two different electrically isolated data buses, it is possible to write one set of values in one set of registers and a different set of values in the other set of registers. This architectural feature is important to the present invention. It supports transparent and selective 6845 parameter selection from one of two different sources: one from an internal parameter ROM containing the proper 6845 registers parameter values to be used when executing Hercules programs on a PS/2 Monitor, and one from the values being written under software control as usual into the CRT controller registers.

Parameter Translation Algorithm

Because in the original 6845 CRT controller the registers are "write only" (that is, they cannot be read back by software), a Hercules program never attempts to read back a 6845 register. This leads to an important principle employed in the present invention. If, at the time one 6845 register is written into by the Hercules program, the value that the program attempts to write into the respective register could be modified or replaced with another value, the Hercules program would have no means of detecting this change.

There are many ways in which data that the software executing on the host CPU attempts to write to a 6845 register can be altered in real time. In general such a transformation can be expressed as:

final-data=f(host-data, other-data), where:
f( ) is any function of two variables, arithmetic or boolean host-data is the data written by the host; and other-data is the data used to operate on the host-data. It can be a constant, another register value or a result of a previous operation.

The constraint on this real-time function is the execution time required for the transformation: it has to end before any other I/O operation requires the controller I/O data bus. Ideally it should not extend beyond the normal extent of an I/O write.

A particular case of a logic operation is "SUBSTITUTION". The incoming data can be replaced with an appropriate value of the parameter. There are several ways the appropriate value can be stored on chip:

(a.) In a read only memory (ROM) if the value is known and not changing.

(b.) In a random access memory (RAM) or register file which can be written at POST (Power On Self Test) by the Video BIOS.

The preferred embodiment uses method (a.). Hercules cards have two officially supported modes of operation: one text mode (80 characters of $9 \times 14$ pixels each) and one graphics mode ($720 \times 348$ pixels). In practice, there is another graphics mode that is widely used in Hercules programs (and that works properly on Hercules-compatible display controllers) called the "Captured Picture Hercules Mode" (CPHM). It is used to display scanner-captured pictures. Its resolution (640×400 pixels) is different than the standard Hercules graphics mode.

Making the correct choice of the registers to have their values substituted affects the support of the Hercules Captured Picture Mode. The present invention allows HCPM programs to run on PS/2 compatible monitors. For a given PS/2 Compatible monitor type, two sets of parameters are sufficient, if only the appropriate registers get a substituted value. The emphasis here is on the word "appropriate" and an important part of the present invention is the decision as to what register values to operate on.

BRIEF DESCRIPTION OF THE DRAWINGS data receiver circuitry 19 receives and transmits data from and to bus 17, while address receiver circuitry 21 receives address information from bus 17. Circuitry 18, 19 and 21 in turn are connected to chipset 11.

Figure 1:
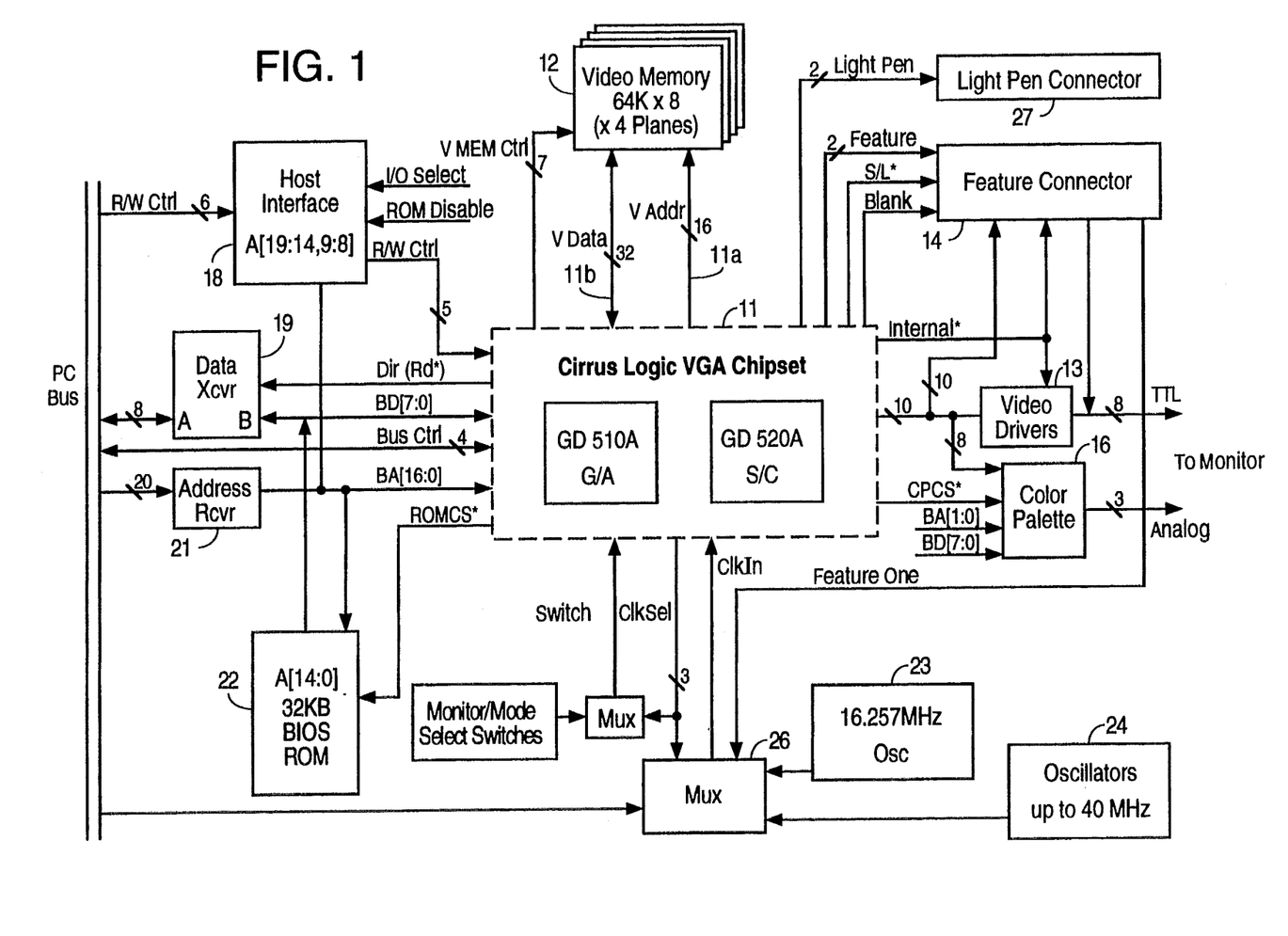
FIG. 1 is a block diagram of a graphics display system in which the present invention may be employed.

A ROM 22 stores the BIOS program for the video operations performed by the circuitry of FIG. 1. Oscillators 23, 24, as well as a 14.318 MHz signal on a line from bus 17, are used to provide different frequency clocking signals for the system through a multiplexor 26, as is well known in the art. Light pen connector circuitry 27 is connected to chipset 11 for interaction with the face of the display monitor.

The additional MCGA 6845 registers utilized in the present invention are summarized in Table 1 below.

TABLE 1

| Abbrev | Register Name | Port | Index | Access | Mode | Type |
|---|---|---|---|---|---|---|
| MODE | Mode Control | 3?8 | — | R/W | All | MCGA External |
| COLOR | Color Select | 3D9 | — | R/W | All | CGA External |
| CONFIG | Configuration | 3BF | — | R/W | All | MGA External |
| R0 | 6845 Horizontal Total | 3?5 | 00 | R/W | Not EGA | Monitor Timing |
| R1 | 6845 Horizontal Displayed | 3?5 | 01 | R/W | Not EGA | Display Timing |
| R2 | 6845 Horizontal Sync Position | 3?5 | 02 | R/W | Not EGA | Monitor Timing |
| R3 | 6845 Sync Width | 3?5 | 03 | R/W | Not EGA | Monitor Timing |
| R4 | 6845 Vertical Total | 3?5 | 04 | R/W | Not EGA | Monitor Timing |
| R5 | 6845 Vertical Total Adjust | 3?5 | 05 | R/W | Not EGA | Monitor Timing |
| R6 | 6845 Vertical Displayed | 3?5 | 06 | R/W | Not EGA | Display Timing |
| R7 | 6845 Vertical Sync Position | 3?5 | 07 | R/W | Not EGA | Monitor Timing |
| R8 | 6845 Interlace Mode | 3?5 | 08 | R/W | Not EGA | Monitor Timing |
| R9 | 6845 Character Cell Height | 3?5 | 09 | R/W | Not EGA | Display Timing |
| RA | 6845 Cursor Start Row | 3?5 | 0A | R/W | Not EGA | Display Timing |
| RB | 6845 Cursor End Row | 3?5 | 0B | R/W | Not EGA | Display Timing |

'?' in the above port addresses are 'B' in monochrome mode and 'D' in color mode.

DESCRIPTION OF THE PREFERRED EMBODIMENT

FIG. 1 is a block diagram of a graphics display system that includes the preferred embodiment of the present invention. The circuitry of the present invention is incorporated in a chipset in enclosure 11. Enclosure 11 includes a graphics/attributes chip and a sequencer/CRT controller chip. Such a chipset is preferably a GD510A/520A type manufactured by Cirrus Logic, Inc. of Milpitas, Calif. and described in a publication titled "GD510A/520A Hardware Technical Reference Manual". That publication is incorporated herein by reference.

The system of FIG. 1 includes a video memory 12 communicating with chipset 11 through an address bus 11a and a bidirectional data bus 11b. Video drivers 13 are connected to chipset 11 and to feature connector circuitry 14 for supplying video signals to a display monitor (not shown). Color palette circuitry 16 is provided for controlling the resulting color of the display on the monitor, as is well known in the art.

Data, address and read and write control (R/W Ctrl) information is supplied to the system from a bus 17 connected to a host computer (not shown). Host interface circuitry 18 receives the R/W Ctrl information, The 6845 timing registers (R0-RB) are not accessable in VGA mode; instead the VGA/EGA CRTC timing registers CR0-CRB are accessable at the indicated port address and index in that mode. R0-RB are accessable while in CGA, MGA, or EGATXT mode.

The 6845 timing registers are grouped into 'Monitor Timing Registers' and 'Display Timing Registers'. These groups may be separately write protected by bits 4 and 5 of the Write Control Register at extensions index 84. The other MCGA-specific registers may be write-protected by bits 6 and 7.

The registers required thus include some additional 'external' registers plus the 'timing registers' subset (R0-RB) of the 6845. 6845 registers RX (Index), RC-D (Screen Start Address), RE-F (Cursor Location), and R10-11 (Light Pen Address) are the same as their CRTC counterparts so are not duplicated. CRTC registers CRS, CRC-CRF, LPENH, and LPENL are used for both EGA and MCGA modes.

Figure 2:
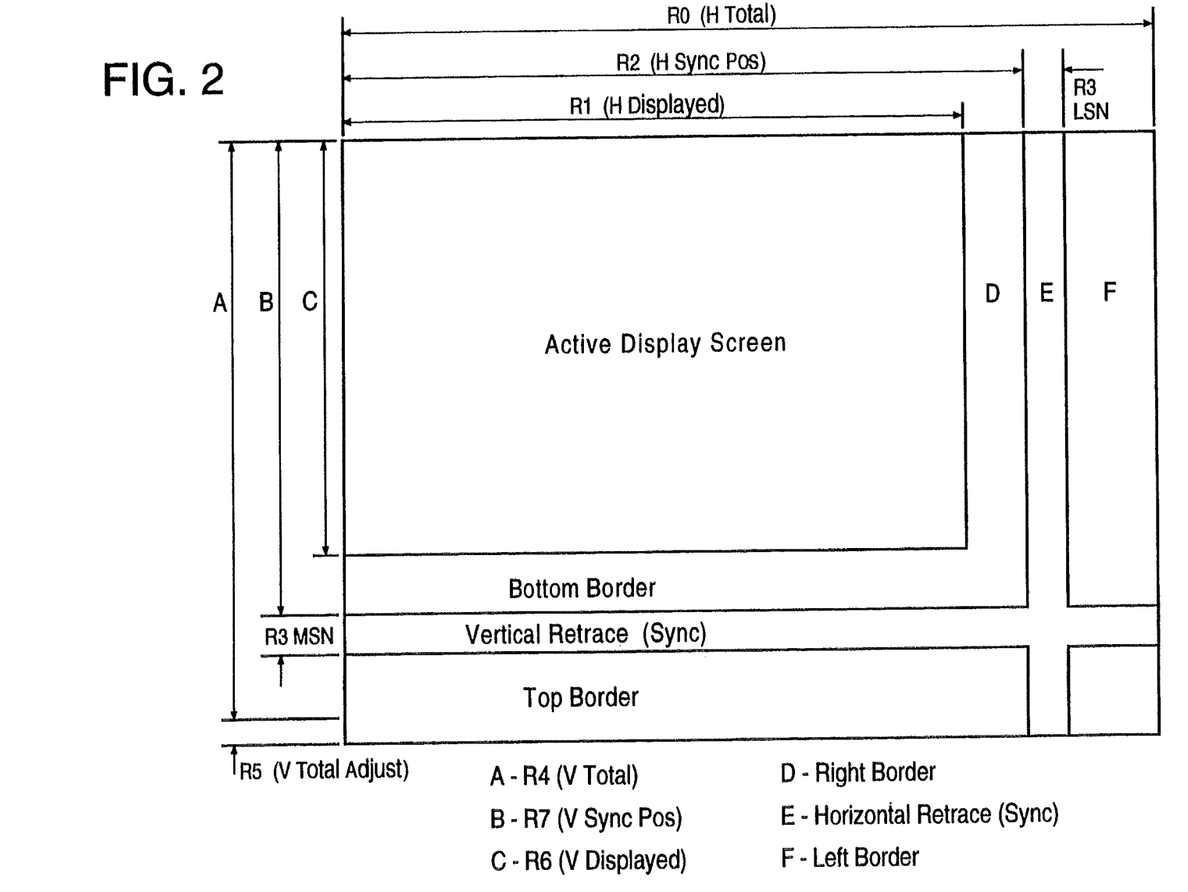
FIG. 2 illustrates the programming model of the different signals in some of the timing registers in a 6845 CRT controller.

FIG. 2 illustrates the functions of the 6845-compatible timing registers R0-R7 employed in the system. In order to run a Hercules program written for a MDA-compatible monitor on a fixed frequency monitor, it is necessary and sufficient to substitute the following 6845 register parameters with appropriate values. The functions of these selected timing registers are as follows:

R0—Horizontal Total
R2—Horizontal Sync Position
R3—Vertical and Horizontal Sync Width
R4—Vertical Total
R5—Vertical Total Adjust
R7—Vertical Sync Position By not including Horizontal Displayed (Register R1) and Vertical Displayed (Register R6) in the above list, the Captured Picture Hercules Mode programs can be run on a fixed frequency monitor. The function of some of the other 6845 registers does not change with the change of monitor types, and some of them, such as the cursor position, have to be directly controlled by the program.

Another important aspect of the present invention is the manner in which the parameter translation mechanism determines whether the program writing to a 6845-compatible register whose value is to be substituted is writing a graphics-mode value or a text-mode value. This is essential in order to select the appropriate value to substitute. To define the decision rules, Table 2 below is used. Table 2 lists the standard text and graphics parameters which Hercules Computer Technology Company advises programmers to use for MDA monitors. Table 2 also lists the optimum values for PS/2-compatible monitors that should be used in accordance with the present invention to permit the Hercules programs to function with a PS/2-compatible monitor.

TABLE 2

PS/2 Monitor Hercules Parameters Translation Table

| Register | Graphics | | Text | | Decision Factor for Text Versus Graphics Mode |
|---|---|---|---|---|---|
| | Standard | PS/2 Value | Standard | PS/2 Value | |
| R0 | 35 | 37 | 61 | 63 | b6 |
| R2 | 2E | 2F | 52 | 52 | b6 |
| R3 | 07 | 27 | 0f | 2D | b3&b2 |
| R4 | 5B | 70 | 19 | 1F | b6* |
| R5 | 02 | 00 | 06 | 02 | b2 |
| R7 | 57 | 62 | 19 | 1C | b6* | hgc-text-mode = (addrR0 + addrR2)&Data-bus[6] +
+ (addrR4 + addrR7)&Data-bus[6]* +
+ addrR3&Data-bus[3]&Data-bus[2] +
+ addrR5&Data-bus[2]
hgc-graphics-mode = hgc-text-mode*
where:
addrRi, i = 0,2,3,4,5,7 is the I/O address signal for 6845 indexed register with the index i
Data-bus[j], j = 0:7 is the I/O data bus bit j
"*" is the boolean negation operator The most significant one or two bits that are different between the standard graphics/text values of the value the Hercules program attempts to write into the register is utilized in this invention to determine whether the intention is to write a graphics or a text parameter value. This graphics/text decision mechanism is highly simplified and speeded-up by using the following principle:

If a and b are two substantially different binary values around which two parameter distributions are tightly centered, then the two distributions can be differentiated by comparing only the most significant bit of a and b in which they differ, or at worst, the two most-significant bits in which they differ.

For instance, if a=5Bh=1011, and b=19h=0001 1001 (where h means that the number is in the hexadecimal base), with the binary notation n=b7 b6 b5 b4 b3 b2 b1 b0, with bi a one-bit binary number,
then b6=0 is enough to categorize any 8-bit binary number into one of two classes:

Class a: n> =01xx xxxx which defines the numbers in the interval [7fh,40h]; and

Class b: n<01xx xxxx which defines the numbers in the interval [3Fh,00h].

In this situation, looking at only one bit of data, it is possible to accurately determine whether the parameter was in the class a (in this case "graphics") or b (in this case "text").

In some cases, for instance in the R3 text/graphics ravage identification, two bits are required to categorize the values.

Figure 3:
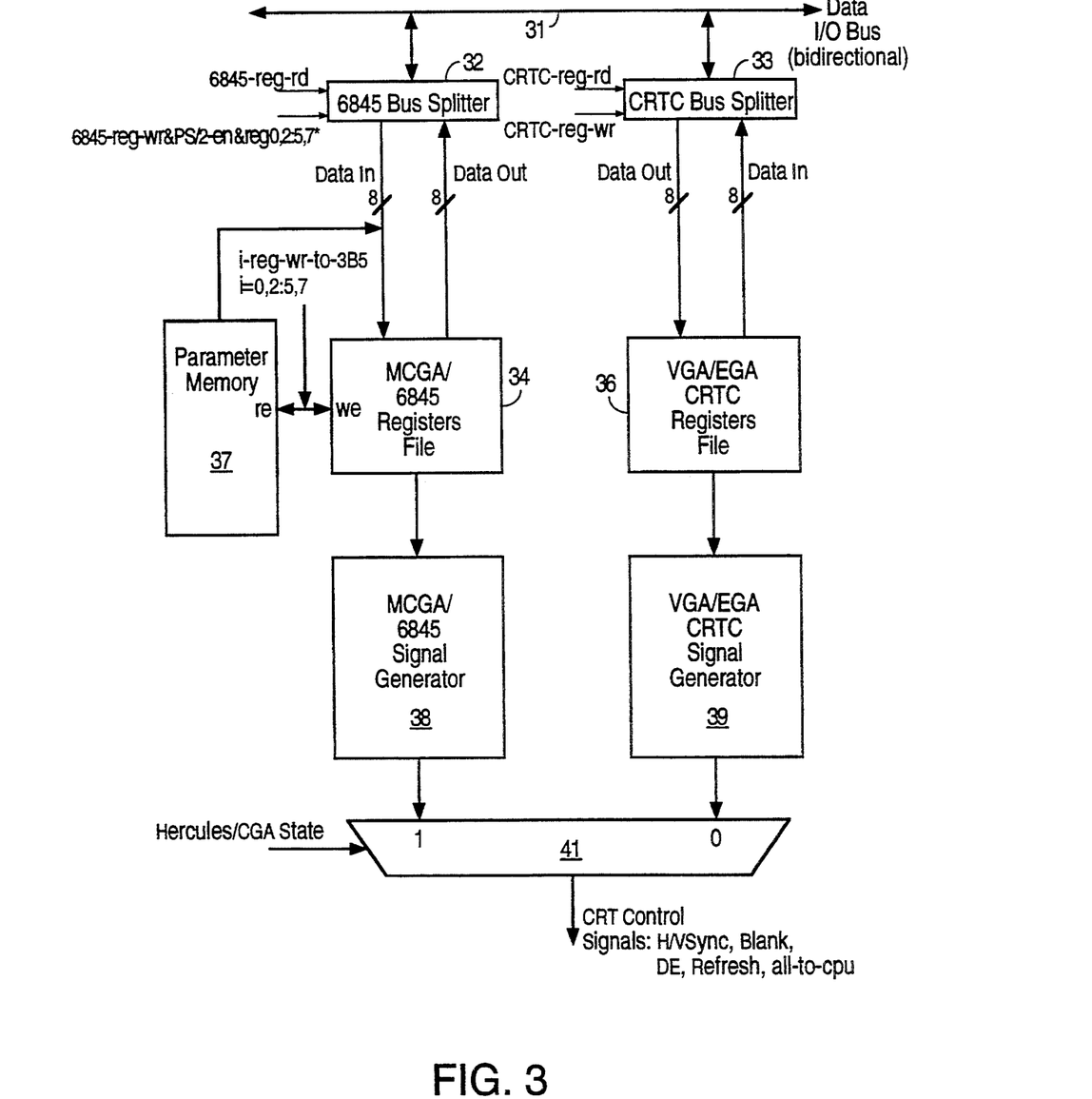
FIG. 3 is a block diagram showing the connections of 6845 timing registers and CRT timing registers for carrying out the present invention.

FIG. 3 shows the block diagram for a portion of the circuitry employed in the substitution of Hercules 6845 register values in accordance with this invention. A data I/O bus 31 has bidirectional communication with a 6845 bus splitter 32 and a EGA/VGA CRTC bus splitter 33. Splitter 32 has bidirectional communication with the MCGA/6845 register set file 34, and splitter 33 has bidirectional communication with the EGA/VGA CRTC register set file 36. A Parameter Memory 37 communicates with register set file 34 for modifying the values written into selected ones of these registers, as will be described in more detail below.

A 6845 signal generator 38 and an EGA/VGA CRTC generator 39 are connected to the outputs of register set files 34, 36, respectively, and supply their outputs as inputs to circuitry 41 whose output represents CRT control signals for the video display. A control input line to circuitry 41 labelled "Hercules/CGA State" indicates to circuitry 41 if it is to operate in the Hercules/CGA state or not.

Algorithm Description

Figure 4A:
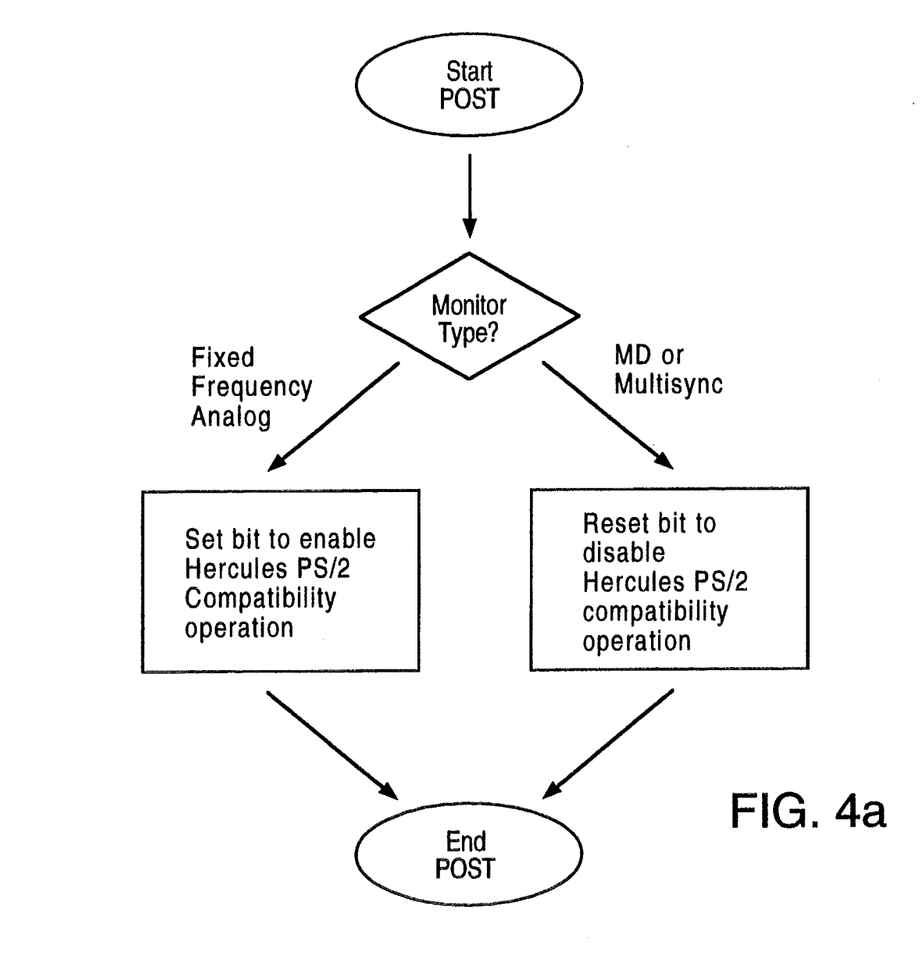
FIGS. 4a and 4b are flow charts illustrating the operation of the invention in executing Hercules programs on a PS/2 compatible monitor.
Figure 4B:
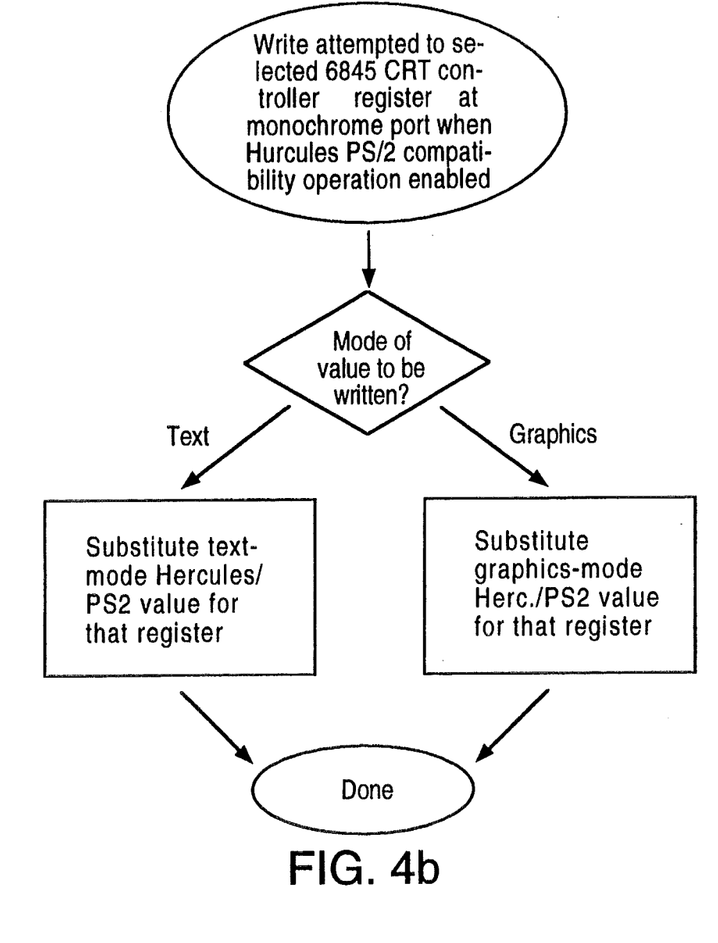

The algorithm by which the Hercules programs are made executable on a fixed frequency monitor is shown in the flow charts of FIGS. 4a and 4b, and is as follows:
 a. During POST (Power On Self Test) the Video BIOS reads the board switches and identifies the type of monitor in the system. Since the user is not supposed to change the monitor attached to the system without re-booting, making this choice at POST time is sufficient.

If a fixed frequency monitor is found, then a special register bit is set that enables Hercules PS/2 compatible monitor operation.

If an MDA or Multi-Sync Monitor is found, the Hercules PS/2 compatible monitor operation is disabled by the BIOS at POST time.
 b. Every time a write is attempted (FIG. 4b) to one of the selected 6845 CRT controller registers at a monochrome port i.e. I/O addresses 3B1, 3B3, 3B5, or 3B7, (rather than address 3D1, 3D3, 3D5, or 3D7 for color ports), if the special register bit has enabled Hercules PS/2-compatible operation, then the value the software is writing to the register is used only to decide whether text mode or graphics mode operation is intended, and the actual value written to the register comes from the Parameter Memory.

FIG. 3 shows the hardware architecture by which the algorithm is implemented. This is as follows:
 a. Inside the system, on either a ROM or a RAM 37, the PS/2 monitor values for selected 6845 CRT controller registers (namely R0, R2, R3, R4, R5 and R7) are stored. This Parameter Memory is addressed by data on the same data bus from which the 6845 registers load data.
 b. Every time a write to one of the selected 6845 CRT controller registers at a monochrome port occurs, a signal is generated which, based on the value of the data the host CPU attempts to write into the respective register, determines whether this is a text or a graphics mode. Looking only to monochrome port I/O addresses detects Hercules versus CGA I/O writes to 6845 registers: this mechanism has to work only with Hercules programs.

c. The written register address and the text/graphics mode signal make up the Parameter Memory address that selects the proper PS/2 parameter value for the mode the Hercules program is going to operate in.

d. A write to a selected 6845 register at the monochrome port generates a simultaneous read from the Parameter Memory of the proper value to be written into the register as a substitute for the value the host CPU, directed by the Hercules program, attempted to write. At the same time, the data from the host CPU will not be placed on the internal I/O data path so that it does not interfere with the data read from the parameter memory.

e. To ensure proper data hold time, the parametric memory read is extended beyond the register write pulse.

It should be noted that the Current Adapter State (EGA/VGA/CGA, Hercules or Enhanced Text) is not a factor in determining the operation. Due to a special data bus architecture, the EGA/VGA CRTC registers, even the one with the same index as the 6845 register that gets its value from the Parameter Memory, is always written with the host CPU data.

This architecture allows the system to function properly because in EGA/VGA state a write to a monochrome I/O port will write into both the VGA/EGA CRTC and the 6845 registers, but only the 6845 registers are written into with the substituted values, while the VGA/EGA CRTC registers always get the host CPU value. If the write was a normal EGA/VGA operation (e.g. the start of a new EGA/VGA program) the write to the 6845 register does not affect anything, but if it was the start of a Hercules program, before the Active Adapter State switched to Hercules state, then the correct parameter value is written into the 6845 register.

Actual Implementation Details

An actual implementation of the invention used a 10×8 ROM as Parameter Memory 37: 10 parametric values of 8 bits each are stored; 5 for text mode and 5 for graphics mode.

Miscellaneous Control Register (Extension Register with the index 87) bit 2, called bit ER87[2], is used to enable the Hercules parameter translation for the PS/2 compatible monitor. This bit is set to 1 by the Video BIOS during POST if a PS/2 compatible monitor is detected and it is set to 0 otherwise. Any time an I/O write to register Ri occurs, if i=0, 2, 3, 4, 5 or 7 and if ER87[2] is H, the 6845 register file internal data bus is closed to data coming from the I/O Data host CPU pins, and the system reads parameter memory 37 instead.

The address to the parameter memory is the address to Ri register

AND the HGC-text-mode signal, for text values

AND the HGC-text-mode signal negated, for graphics values.

Table 2 shows the logic equation of the HGC-text/graphics-mode signal.

Because 6845 and CRTC register files have different internal data buses, this mechanism affects only the 6845 registers, and the EGA/VGA CRT controller registers addressed at the same index are always written with the host CPU data.

We claim:

1. In a computer system capable of operating with a plurality of computer programs, some of which are normally compatible with an output display device connected to said computer system and others of which are normally non-compatible with said output display device, said computer system comprising an input/output bus, a display controller having a first set of registers having input and output terminals, means connecting said input terminals to said input/output bus and means selectively connecting said output terminals to said output display device, said display controller having a second set of registers having input and output terminals, means connecting said input terminals to said input/output bus and means selectively connecting said output terminals to said output display device, said first set of registers being operable to provide control signals to said output display device for said programs which are normally non-compatible with said output display device, said second set of registers being operable to provide control signals to said output display device for said programs which are normally compatible with said output display device, each of said plurality of programs providing to said first set of registers over said input/output bus a plurality of particular parameter values, a method of reconfiguring said first set of registers in order to provide compatibility between said output display device and ones of said programs normally non-compatible with said output display device, said method comprising the steps of:

using said plurality of particular parameter values from one of said plurality of programs to determine whether said one of said programs is of a type normally compatible or normally non-compatible with said output display device; and if said one of said programs is of a type normally non-compatible with said output display device, modifying said plurality of particular parameter values received by said first set of registers to produce modified parameter values to enable execution of said normally non-compatible programs on said output display device.

2. A method in accordance with claim 1 in which said first set of registers includes special registers which are normally loaded with particular parameter values provided by said one of said non-compatible programs for execution of said normally non-compatible programs, said modifying step of said method including the steps of:

detecting an attempted loading of said particular parameter values to be loaded into said special registers;

substituting said modified parameter values in said special registers in place of said particular parameter values upon said detection of said attempted loading of said particular parameter values; and executing said one of said non-compatible programs utilizing said modified parameter values in said special registers.

3. A method in accordance with claim 2 including the step of generating said modified parameter values for said special registers from a memory containing conversions from said particular parameter values to said modified parameter values.

4. A method in accordance with claim 2 in which said non-compatible programs can be executed in either a graphics mode or a text mode, said modifying step including the step of:

determining, at each attempt of said one of said non-compatible programs directly loading said particular parameter values in said first set of registers, whether said one of said non-compatible programs is to operate in said graphics mode or said text mode.

5. A method in accordance with claim 4 including the step of:
generating said modified parameter values for said first set of registers based on whether said one of said non-compatible programs is to be executed in said graphics mode or said text mode.

6. A method in accordance with claim 1 in which said modifying step includes the step of determining the nature of said output display device in the current configuration of said computer system; and
selecting a compatibility mode of operation, if necessary, for said system based on said determination of said output display device.

7. A method in accordance with claim 6 including
selecting a first mode of operation for said system if said one of said programs to be executed is compatible with said output display device; and
selecting a second mode of operation for said system if said one of said programs to be executed is not compatible with said output display device.

8. A method in accordance with claim 7 in which said one of said programs can be executed in either a graphics mode or a text mode, said method including the steps of:
determining whether said one of said programs to be executed is to operate in said graphics mode or said text mode, when said selected mode of operation is said second mode;
substituting text mode values in said first set of registers when said determined mode is said text mode; and
substituting graphics mode values in said first set of registers when said determined mode is said graphics mode.

9. A method in accordance with claim 7 including the steps of:
utilizing said second set of said registers for storing said particular parameter values for said compatible programs; and
utilizing said first set of said registers for storing said particular parameter values for said non-compatible programs.

10. A method in accordance with claim 9 including the step of:
utilizing only said particular parameter values in said second set of registers when said first mode of operation is selected.

11. A method in accordance with claim 9 including the step of:
modifying said particular parameter values to be stored in said first set of registers when said second mode of operation is selected.

12. A system for reconfiguring a computer system capable of operating with a plurality of computer programs, some of which are normally compatible with an output display device connected to said computer system and others of which are normally non-compatible with said output display device, said computer system having an input/output bus, wherein each of said programs sends to said input/output bus a plurality of particular parameter values, said system comprising:
a display controller comprising:
a first set of registers having input terminals and output terminals, said input terminals being coupled to said input/output bus and said output terminals being selectively coupled to said output display device, said first set of registers being operable to provide control signals to said output display device for said programs which are normally non-compatible with said output display device; and
a second set of registers having input terminals and output terminals, said input terminals being coupled to said input/output bus and said output terminals being selectively coupled to said output display device, said second set of registers being operable to provide control signals to said output display device for said programs which are normally compatible with said output display device;
means for decoding said particular parameter values sent by said programs to determine whether said programs are compatible or non-compatible with said output display device, said means for decoding being coupled to said input/output bus; and
means for modifying said particular parameter values, supplied by said programs to said decoding means, to produce modified parameter values in the event said programs are determined to be normally non-compatible with said output display device, said modified parameter values establishing compatibility between said non-compatible programs and said output display device.

13. A system in accordance with claim 12 in which said first set of registers includes special registers which are normally loaded with said particular parameter values for execution of said non-compatible programs, said system including:
means for detecting an attempted loading of said particular parameter values to be loaded into said special registers;
means for substituting said modified parameter values in said special registers in place of said particular parameter values upon said detection of said attempted loading of said particular parameter values; and
means for executing said non-compatible programs utilizing said modified parameter values in said special registers.

14. A system in accordance with claim 13 further comprising means for generating said modified particular parameter values for said special registers from a memory containing conversions from said particular parameter values to said modified parameter values.

15. A system in accordance with claim 12 in which said non-compatible programs can be executed in either a graphics mode or a text mode including;
means for determining, at each attempt of said non-compatible programs directly loading said particular parameter values in said first set of registers, whether said non-compatible programs are to operate in said graphics mode or said text mode.

16. A system in accordance with claim 15 including;
means for generating said modified parameter values for said first set of registers based on whether said non-compatible to be executed in a graphics mode or a text mode.

17. A system in accordance with claim 15 including:

means for determining the nature of said output display device in the current configuration of said computer system; and means for selecting a compatibility mode of operation, if necessary, for said system based on said determination of said output display device.

18. A system in accordance with claim 17 including:

means for selecting a first mode of operation for said system if said programs that are to be executed are compatible with said output display device; and means for selecting a second mode of operation of said system if said programs that are to be executed are not compatible with said output display device.

19. A system in accordance with claim 18 in which said programs can be executed in either a graphics mode or a text mode, said system including:

means for substituting text mode values in said first set of registers when said determined mode is said text mode; and means for substituting graphics mode values in said first set of registers when said determined mode is said graphics mode.

* * * * *